(12) United States Patent
Fechser

(10) Patent No.: US 6,360,308 B1
(45) Date of Patent: Mar. 19, 2002

(54) BUFFER CONTROLLER

(75) Inventor: David A. Fechser, Fort Collins, CO (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/163,835

(22) Filed: Sep. 30, 1998

(51) Int. Cl.[7] ............................................. G06F 12/00
(52) U.S. Cl. ...................... 711/218; 711/211; 711/212; 711/219; 711/220
(58) Field of Search ...................... 711/212, 218–220, 711/211, 154, 157

(56) References Cited

U.S. PATENT DOCUMENTS

| | | | |
|---|---|---|---|
| 4,079,451 A | * 3/1978 | Wodds et al. | 364/200 |
| 4,206,503 A | 6/1980 | Woods et al. | 364/200 |
| 4,240,142 A | * 12/1980 | Blahut et al. | 364/200 |
| 5,481,689 A | 1/1996 | Stamm et al. | 395/412 |
| 5,696,924 A | 12/1997 | Robertson et al. | 395/412 |
| 5,724,540 A | * 3/1998 | Kametani | 395/421.1 |
| 5,784,712 A | * 7/1998 | Byers et al. | 711/219 |

* cited by examiner

Primary Examiner—Matthew M. Kim
Assistant Examiner—Pierre M. Vital

(57) ABSTRACT

A method and apparatus for accessing successive memory locations without the need for multiple index register writes and without the need for a wide address bus from the controller into a memory control system. The memory control system includes an index register and a data register. The index register has a connection to the controller and the buffer. The data storage register has a connection to the buffer and to the controller. The index register receives an address to a location in the buffer. Each time the contents of the index register are changed, data associated with the address are automatically written into the data storage register. Each time the data storage register is accessed (read or written), the index register in incremented. The controller is able to read or write unlimited numbers of sequential locations up to the full buffer space, using only a single controller access per byte.

33 Claims, 4 Drawing Sheets

BUFFER CONTROLLER

BACKGROUND OF THE INVENTION

1. Technical Field

The present invention relates to an improved data processing system and in particular to a method and apparatus for transferring data. Still more particularly, the present invention relates to an improved buffer controller.

2. Description of the Related Art

A compact disc read-only memory (CD-ROM) is a form of storage characterized by high capacity (roughly 650 megabytes) and the use of laser optics rather than magnetic means for reading data. Although CD-ROM drives are strictly read-only, they are similar to CD-R drives (write once, read many), optical WORM devices, and optical read-write drives. CD-ROM drives have become a common media for storing data and programs. Integrated circuits (ICs) and buffers are used in a CD-ROM drive to decode and transfer data from a CD-ROM to a computer. A buffer used in the transfer of data may be as large as 4 megabytes of a word-wide dynamic random access memory (DRAM) for a total of 8 megabytes of data. A "word" is the native unit of storage on a particular data processing system. A word is the largest amount of data that can be handled by the microprocessor in one operation and also, as a rule, is usually the width of the main data bus. 16-bit and 32-bit words are the most common sizes.

To improve data transfer speeds and increase target-side cache capabilities, large memory buffers are needed to store the CD-ROM data. Eight megabytes (MB) of CD-ROM data stored in a 4m×16 memory, for example, would require 22 address lines–23 address lines for byte-wide access. The access speed should be as fast as possible. Data is stored in the buffer for sequential addresses. For example, an access to a location N would be followed by accesses to locations N+1, N+2 and so on in sequential order. Most CD-ROM controllers, however, are 8-bit controllers. As a result, word-wide or greater accesses require multiple byte-wide read and/or writes by these controllers. Most CD-ROM controllers are unable to supply a 22-bit address. Further, while an indexed addressing scheme could solve the problem of address size, this scheme would mean that each read access would require several writes to supply the 22-bit address and a read to actually obtain the desired data. A write access would require a similar number of byte-wide accesses by the controller. A flag also might be required to indicate whether a read or write access is to be performed, which could require an additional access to the IC.

Therefore it would be advantageous to have an improved method and apparatus to access data in the buffer from the controller.

SUMMARY OF THE INVENTION

The present invention provides a method and apparatus for accessing successive memory locations without the need for multiple index register writes and without the need for a wide address bus from the controller into a memory control system. The memory control system includes an index register and a data register. The index register has a connection to the controller and the buffer. The data storage register has a connection to the buffer and to the controller. The index register receives an address to a location in the buffer. Each time the contents of the index register are changed, data associated with the address are automatically written into the data storage register. Each time the data storage register is accessed (read or written), the index register is incremented. The controller is able to read or write unlimited numbers of sequential locations up to the full buffer space, using only a single controller access per byte.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION

Figure 1:
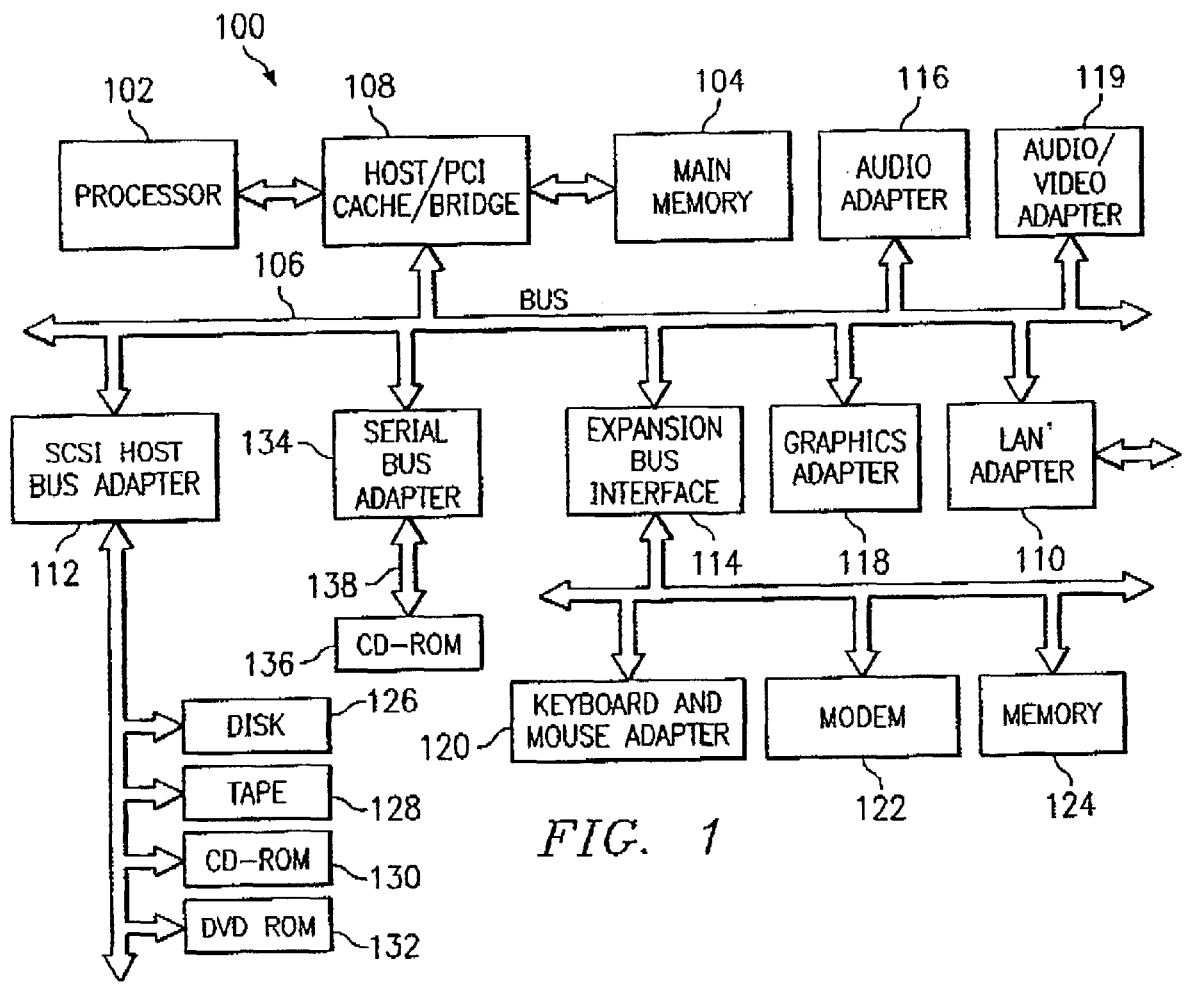
FIG. 1 is a block diagram of a data processing system in which the present invention may be implemented.

With reference now to the figures and in particular with reference to FIG. 1, a block diagram of a data processing system in which the present invention may be implemented is illustrated. Data processing system 100 is an example of a computer, which employs a peripheral component interconnect (PCI) local bus architecture. Although the depicted example employs a PCI bus, other bus architectures such as Micro Channel and ISA may be used. Processor 102 and main memory 104 are connected to PCI local bus 106 through PCI bridge 108. PCI bridge 108 also may include an integrated memory controller and cache memory for processor 102. Additional connections to PCI local bus 106 may be made through direct component interconnection or through add-in boards. In the depicted example, local area network (LAN) adapter 110, SCSI host bus adapter 112, and expansion bus interface 114 are connected to PCI local bus 106 by direct component connection. In contrast, audio adapter 116, graphics adapter 118, and audio/video adapter (A/V) 119 are connected to PCI local bus 106 by add-in boards inserted into expansion slots. Expansion bus interface 114 provides a connection for a keyboard and mouse adapter 120, modem 122, and additional memory 124. SCSI host bus adapter 112 provides a connection for hard disk drive 126, tape drive 128, CD-ROM drive 130, and digital video disc read only memory drive (DVD-ROM) 132 in the depicted example. Typical PCI local bus implementations will support three or four PCI expansion slots or add-in connectors.

Data processing system 100 also includes a serial bus adapter 134, which conforms to IEEE 1394 in the depicted example. A CD-ROM drive 136 is connected to serial bus adapter 134 by serial bus 138.

An operating system runs on processor 102 and is used to coordinate and provide control of various components within data processing system 100 in FIG. 1. The operating system may be a commercially available operating system such as OS/2, which is available from International Business Machines Corporation or Windows NT, which is available from Microsoft Corporation. "OS/2" is a trademark of from International Business Machines Corporation. Those of ordinary skill in the art will appreciate that the hardware in FIG. 1 may vary depending on the implementation. For example, other peripheral devices, such as optical disk drives and the like may be used in addition to or in place of the hardware depicted in FIG. 1. The depicted example is not meant to imply architectural limitations with respect to the present invention. For example, the processes of the present invention may be applied to multiprocessor data processing system.

Figure 2:
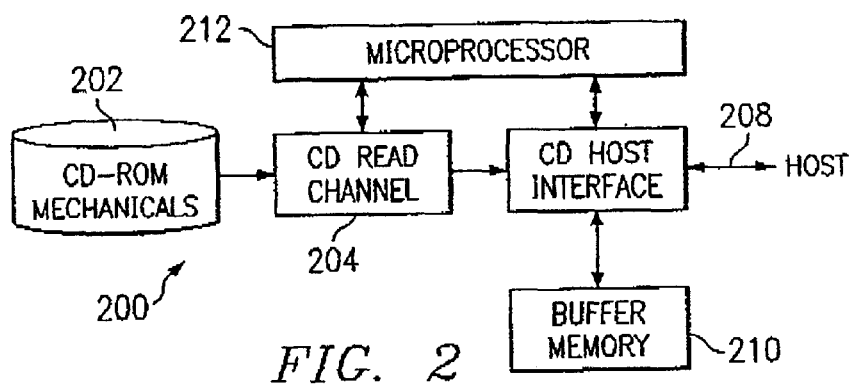
FIG. 2 is a block diagram of an optical data storage system in the form of a CD-ROM drive in accordance with a preferred embodiment of the present invention.

Turning now to FIG. 2, a block diagram of an optical data storage system in the form of a CD-ROM drive is illustrated in accordance with a preferred embodiment of the present invention. CD-ROM drive 200 is a more detailed diagram of CD-ROM drive 136 and/or CD-ROM drive 130 in FIG. 1. CD-ROM drive 200 includes CD-ROM mechanicals 202, a CD read channel 204, and a CD host interface 206. CD-ROM mechanicals 202 includes the components such as a servo motor, spindle, disc holder, laser beam, and associated optics and electronics used in generating a data signal in response reading data from a CD-ROM. The data signal generated by CD-ROM mechanicals 202 is sent through CD read channel 204. CD read channel 204 generates a serial data stream, containing data and subcode, which is sent to CD host interface 206. CD read channel 204 includes other circuits that are used to control CD-ROM mechanicals 202, such as, for example, control circuitry for the servo motor. In turn, CD host interface 206 processes the data for transfer to the host. In the depicted example, CD-ROM drive 200 is connected to a serial bus 208, conforming to IEEE 1394.

Although the CD-ROM drive depicted example is connected to a 1394 serial bus, the present invention is equally a CD-ROM drive connected to other bus types, such as, for example, a SCSI bus. Furthermore, although the depicted mechanicals are that of a CD-ROM, other types of data storage mechanisms may be employed. For example, a data storage mechanism, such as, a hard disk or DVD mechanism may be connected to a read channel.

Data is stored in buffer memory 210 prior to being transferred to the serial bus by CD host interface 206. CD-read channel 204 and CD host interface 206 are both controlled by controller 212, which is a microprocessor in the depicted example. Although a read only CD-ROM device is illustrated, the present invention is equally applicable for use in a read/write CD-ROM drive. The present invention may be applied to other data storage systems, such as for example a hard disk drive or a digital video disc (DVD) drive.

Figure 3:
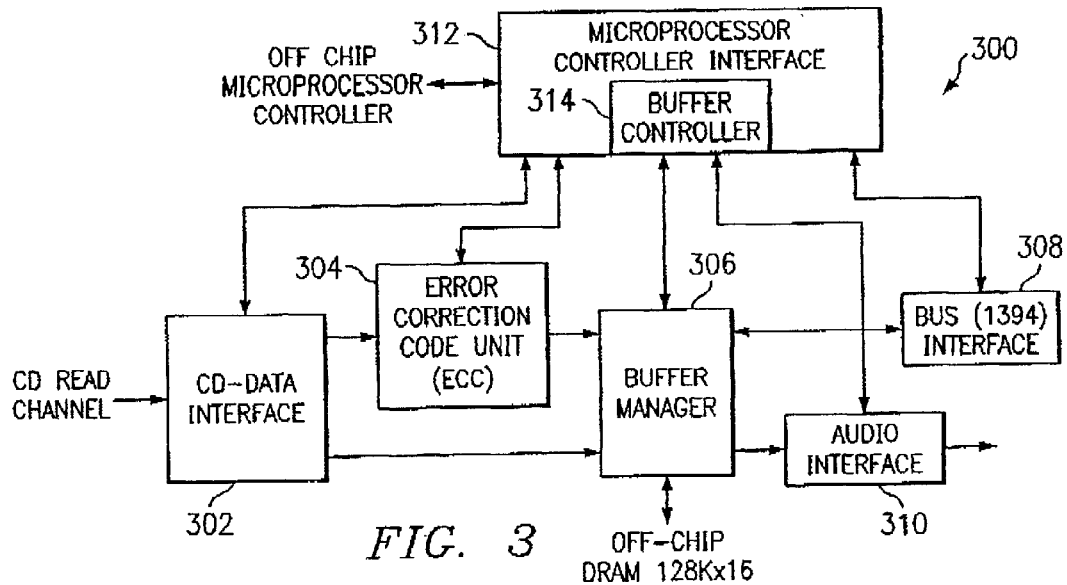
FIG. 3 is a block diagram of a CD host interface in accordance with a preferred embodiment of the present invention.

Turning now to FIG. 3, a block diagram of a CD host interface is depicted in accordance with a preferred embodiment of the present invention. CD host interface 300 is a memory control system that includes CD data interface 302, error correction code (EEC) unit 304, a buffer manager 306, bus interface 308, audio interface 310, and a microcontroller interface 312. CD host interface 300 is implemented within a single chip or IC, such as a SYM12FW600 chip available from LSI Logic Corporation in the depicted example. CD data interface 302 receives data and subcode from the CD read channel. The data is in the form of a serial data stream. The serial data and sub-code streams are received by CD data interface 302 via separate channels from the CD read channel. CD data interface 302 is responsible for monitoring the sequence of data received, either in CD-ROM format or CD-DA format. CD-DA format data is audio data, while CD-ROM format data is data that will be sent to the host for processing. The architecture of CD data interface 302 is such that it accommodates interruptions in the data stream. The CD data interface 302 is designed such that it is capable of sensing the next sequential series of data so it does not create overlapped or gapped data in the buffer.

CD data interface 302 will send data requiring error correction code to EEC unit 304. In the depicted example, ECC unit 304 performs the standard Reed-Solomon third-level CD-ROM error correction on a data block on the fly. This on-the-fly ECC mode makes use of syndromes and error flags provided by the servo/DSP CIRC. In this mode, the data is only corrected to the point that data transfer speed is not hindered. Data, such as CD-DA, that does not require error corrections is sent directly to buffer manager 306.

Buffer manager 306 controls the off-chip buffer memory, which may be, for example, standard or EDO-DRAM. Buffer manager 306 manages the transfer of data from the buffer to the bus via bus interface 308. This data transfer includes audio data. Buffer manager 306 automatically maintains the buffer data integrity through refresh cycles. Buffer manager 306 also arbitrates requests for access to the buffer. Bus interface 308 provides the interface to the bus, which is a 1394 serial bus in the depicted example. Bus interface 308 performs the functions needed to place data into packets for transport onto the bus. In addition, bus interface 308 may receive commands from the 1394 serial bus and pass them on the microprocessor that is used as the controller. Audio interface 310 uses a serial interface similar to the read channel to return CD-DA data from the buffer for audio reproduction. Audio interface may be connected to a headphone jack in the CD-ROM drive.

Microprocessor controller interface 312 provides an interface to a microprocessor, which is off chip on the depicted example. An on chip microprocessor may be used depending on the amount of integration. Microprocessor controller interface 312 supports separate parallel and multiplexed address and data buses with the associated control signals in the depicted example. Microprocessor controller interface 312 provides access to the external buffer memory by way of buffer manager 306. This configuration allows the microcontroller to manipulate data in the buffer, if necessary. Microprocessor controller interface 312 allows firmware to be downloaded from the 1394 bus to the microcontroller, which may store the code on a flash ROM. In the depicted example, buffer controller 314, located within microprocessor controller interface 312, includes the processes that provide the features of the present invention. This buffer controller is described in more detail in FIG. 4 below.

Figure 4:
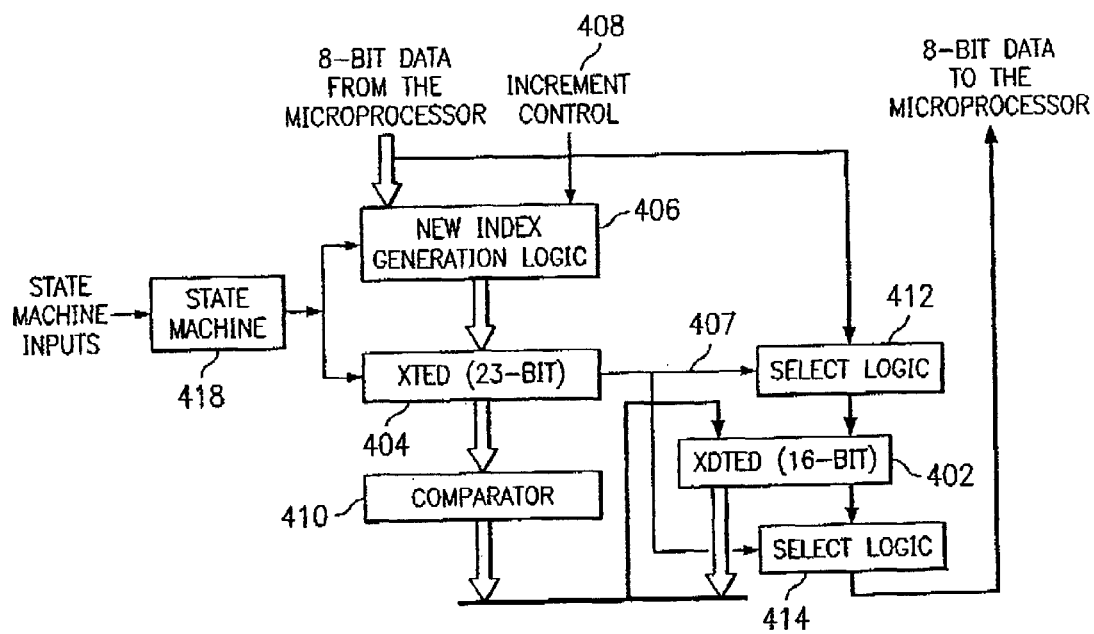
FIG. 4 is a block diagram of an indexed buffer controller circuit in accordance with a preferred embodiment of the present invention.

Turning next to FIG. 4, a block diagram of an indexed buffer controller circuit is depicted in accordance with a preferred embodiment of the present invention. The circuitry and processes of the present invention are located within an auto-incrementing, word-wide, byte-accessed index buffer controller (buffer controller) 314 within microprocessor controller interface 312. Indexed buffer controller circuit 400 is a controller that may be used in buffer controller 314 in FIG. 3 and is an auto-incrementing, word-wide, byte-accessed, index buffer controller in the depicted example.

Indexed buffer controller circuit 400 includes two registers, XDTED 402 and XTED 404. In the depicted example, XDTED 402 is a 16 bit data storage register with byte-wide access. XDTED 402 holds data written to the buffer or read from the buffer. A write to either byte of this register causes XDTED 402 to write the entire register value to the buffer. An access to either byte of XDTED 402 causes XTED 404 to be incremented. XTED 404 is a 23 bit buffer index register with an auto increment feature. Bit 0 of this register is used to select between the lower byte (bits 7 to 0) or the higher byte (bits 15 to 8) of XDTED 402 to be accessed by the microprocessor. Bits 22 to 1 contain the location in the buffer to be read from or written to by XDTED 402. Any access of XDTED 402 causes XTED 404 to be incremented. If the index register bit, bit 0, was high (logic "1"), then the increment will cause a change to bits 22 to 1, invoking a read from the buffer to XDTED 402.

Within logic indexed buffer controller circuit 400 is a new index generation logic unit 406, which provides an index for the indexed buffer controller in the form of a 23 bit address. New index generation logic unit 406 receives input in the form of an address from the microprocessor and or in the form of an increment control signal 408. The input to new index generation logic unit 406 is either an address written by the microprocessor or a signal enabling the auto increment feature for XTED 404 that increments the address in XTED 404. The input from the microprocessor is in the form of 8-bit data in the depicted example. Increment control signal 408 originates from a register bit outside of this circuit and causes new index generation logic unit 406 to increment the value in XTED 404 when XDTED is accessed as described above.

The microprocessor may send an address to new index generation logic unit 406. Three writes by the microprocessor are required to write a 23 bit address into new index generation logic unit 406. When the address is written into new index generation logic unit 406, new index generation logic unit 406 will write the address into XTED 404. The address is written into bits 22 to 0. Alternatively, the new index generation logic unit 406 may increment the address within XTED 404 in response to an access to XDTED 402 by the microprocessor.

Each time XTED 404 is changed, the address goes to the buffer through comparator 410. Comparator 410 compares the address bits 22 to 1, received from XTED 404 to the address previously received from XTED 404. If the address is different, the contents of comparator 410 are sent to the buffer to initiate a read or write access.

XTED 404 generates a select signal 407 from bit 0 of the 23 bit address. This signal is sent to select logic 412 and select logic 414. Select logic 412 receives data as an input and will write the data to either the MSB or LSB portion of XDTED 402 based on the value of the select signal 407 generated from the 0 bit of the 23 bit address in XTED 404. Select logic 414 will retrieve either the MSB or LSB portion of XDTED 402, based on the value of the select signal 407 generated from the 0 bit of the 23 bit address in XTED 404. In the depicted example, a logic 0 in select signal 407 will select the LSB, while a logic 1 in select signal 407 will select the MSB.

In a write access to the buffer, the microprocessor makes two 8 bit writes to XDTED 402. The 8 bit value is written to the MSB (bits 15–8) if bit-0 407 of XTED 404 is a one and to the LSB (bits 7–0) if bit 0 407 of XTED 404 is a zero, as controlled by the select logic 412. Each time a byte is written to XDTED 402, the entire 16 bit value in XDTED 402 is automatically written to the location in the buffer specified by bits 22–1 of the value in XTED 404. If the increment control signal 408 is high than each write to XDTED 402 also causes the value in XTED 404 to increment by one. If bit 0 of XTED 404 is '0', then the increment will change this to '1'. If bit 0 is '1', then the increment will change this to a '0' and will cause changes to the higher order bits 22–1. A change in bits 22–1 causes the comparator 410 to initiate a read operation from the buffer, loading XDTED 402 with the 16 bit value located in the buffer at the new location specified by bits 22–1 of XTED 404.

Through the auto increment feature in XTED 404, successive sequential writes to the buffer can be made without having to reload the address for each write operation. The next address is generated by incrementing the address already loaded in XTED 404. New index generation logic unit 406 increments XTED 404 as long as the increment feature is enabled by increment control signal 408.

In a read access to the buffer, the microprocessor makes two 8 bit reads to XDTED 402. The 8 bit value is read from the MSB (bits 15–8) if bit 0 407 of XTED 404 is a one and from the LSB (bits 7–0) if bit 0 407 of XTED 404 is a zero, as controlled by the select logic 414. If the increment control signal 408 is high, then each read from XDTED 402 causes the value in XTED 404 to increment by one. If bit 0 of XTED 404 is '0', then the increment will change this to '1'. If bit 0 is '1', then the increment will change this to a '0' and will cause changes to the higher order bits 22–1. A change in bits 22–1 causes the comparator 410 to initiate a read operation from the buffer, loading XDTED 402 with the 16 bit value located in the buffer at the new location specified by bits 22–1 of XTED 404.

State machine 418 is employed to control XTED 404 and new index generation logic 406. The function of state machine 418 is described in more detail in FIG. 5.

Figure 5:
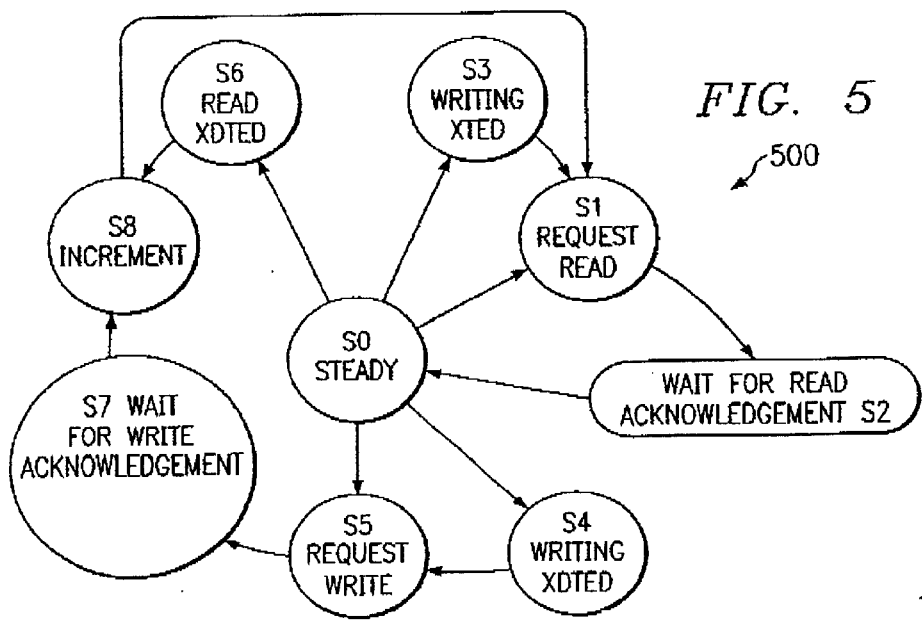
FIG. 5 is a diagram of states in a state machine used in the indexed buffer controller circuit in accordance with a preferred embodiment of the present invention.

Turning now to FIG. 5, a diagram of a states in a state machine used in the indexed buffer controller circuit in FIG. 4 is depicted in accordance with a preferred embodiment of the present invention. State machine 500 in FIG. 5 includes the following states: steady (STEADY) state S0, request read (REQ_READ) state S1, wait for read acknowledgment (WAIT_FOR_RACK) state S2, writing XTED (WRITING_XTED) state S3, writing XDTED (WRITING_XDTED) state S4, request write (REQ_WRITE) state S5, reading XDTED (READING_XDTED) state S6, a wait for write acknowledgment (WAIT_FOR_WACK) state S7, and an increment (INCREMENT) state S8. State machine 500 receives inputs as shown in Table 1 below:

TABLE 1

| Input | Definition |
| --- | --- |
| CCLK | System clock - controls all register elements in the logic and the state machine. |
| RSTb | Active low reset signal. |
| WdReg[7:0] | 8-bit data bus from the Microprocessor. |
| UCRACK | "Read Data from the Buffer is Ready" indicator. |
| UCWACK | "Data to the Buffer was Accepted" indicator. |
| UCDO[15:0] | 16-bit data bus from the buffer. |
| RdXDTED | Read data register control signal. |
| WrXDTEDH | Write data register high byte control signal. |
| WrXDTEDL | Write data register low byte control signal. |
| NOTE: | High/low byte selection of the Data Register is determined by bit-0 of the value in the Index Register (XTED). |
| INCTED | Active-High Auto-Increment control signal. |
| WrXTEDH | Write Address Register High Byte control signal. |
| WrXTEDL | Write Address Register Low Byte control signal. |
| WrXTEDM | Write Address Register Middle Byte control signal. |

State machine 500 generates the following output as show in Table 2 below:

TABLE 2

| Output | Definition |
| --- | --- |
| StillRdXDTED | Buffer read into Data Register is Not Complete indicator. |
| XDTEDNeedsRead | "The Value in XDTED[15:0] is Inaccurate: this is a Buffer Read Required" indicator. |
| UCA[22:1] | 22-bit Address from the Index Register sent to the Buffer. The Index Register is 23-bits wide but bit-0 is used to select between the high and low bytes of the data register and is not sent to the buffer. |
| UCD[15:0] | 16-bit Data from the Data Register sent to the Buffer. |
| UCRD | Read Request to the Buffer asking for new data for the Data Register. |
| UCWR | Write Request to the Buffer asking to write data from the Data Register. |

TABLE 2-continued

| Output | Definition |
| --- | --- |
| TEDRDY | Indicates to the Microprocessor that the Data Register has a good value; i.e. the automatic Buffer Read operation is complete. |

Table 3 specifies registers used by state machine 500:

TABLE 3

| Register | Definition |
| --- | --- |
| STATE[3:0] | Holds the current state of the state machine. |
| XDTED [15:0] | Data Register. This register is loaded from the UCDO bus through automatic reads from the buffer (UCRACK) or from the WdReg bus through writes from the Microprocessor. |
| XTED[22:0] | Index Register; bits-22:1 hold the Address sent to the buffer and bit-0 holds the signal that selects the high or low byte of the Data Register. Each time any of bits-22:1 in this register are changed the buffer is read and a new value is loaded in the Data Register. This is loaded by 8-bit writes from the Microprocessor (WrXTEDH, WrXTEDM, |

TABLE 3-continued

| Register | Definition |
| --- | --- |
|  | WrXTEDL) and by auto-incrementing the value after a buffer read (UCRACK) or write (UCWACK) if INCTED is asserted. |

Changes in state machine 500 occur on the positive edge of the system clock (CCLK). Outputs from state machine 500 occur on the rising edge of the system clock (CCLK). Steady state S0 is the state that occurs after a reset occurs and is the state in which state machine 500 waits for some event to occur. Request read state S1 occurs when state machine 500 requests a buffer read. From request read state S1, state machine 500 shifts to read acknowledgment state S2 to wait for a read acknowledgment signal from the buffer. When the signal is received, state machine 500 returns to steady state S0.

From steady state S0, state machine 500 shifts to writing XTED state S3 in response to the microprocessor writing to the index register XTED. State machine 500 then shifts to request read state S1 as described above.

State machine 500 shifts from steady state S0 to writing XDTED state S4 when the microprocessor writes to the data register, XDTED. After the data is written, state machine 500 shifts to request write state S5 to request a buffer write from XDTED to the buffer. From request write state S5, state machine 500 shifts to wait for write acknowledgment state S7 to wait for a write acknowledgment signal from the buffer. When the write acknowledgment signal is received, state machine 500 shifts to increment state S8 to increment XTED. In response to incrementing XTED, state machine 500 will shift to request read state S1 as described above.

From steady state S0, state machine 500 will shift to reading XDTED state S6 in response to the microprocessor reading XDTED. In response to reading of data being done in reading XTED state S6, state machine 500 will shift to increment state S8. In response to incrementing XTED, state machine 500 will shift to request read state SI as described above.

State machine 500 will return to steady state S0 anytime a reset signal RTSb is asserted.

Table 4 shows the conditions that occur for shifting between states within state machine 500:

TABLE 4

| CURRENT STATE | VALUE | CONDITION | NEXT STATE |
| --- | --- | --- | --- |
| STEADY | 6 | XDTEDNeedsRead==1 | REQ_READ |
|  |  | else if WrXTED==1 | WRITING_XTED |
|  |  | else if WrXDTED==1 | WRITING_XDTED |
|  |  | else if RdXDTED==1 | READING_XDTED |
|  |  | else | STEADY |
| REQ_READ | 1 | XDTEDNeedsRead==1 | WAIT_FOR_RACK |
|  |  | XDTEDNeedsRead==0 | STEADY |
| WAIT_FOR_RACK | 2 | UCRACK==1 | STEADY |
|  |  | UCRACK=0 | WAIT FOR RACK |
| WRITING_XTED | 3 | WrXTED==1 | WRITING_XDTED |
|  |  | WrXTED==0 | REQ_WRITE |
| WRITING_XDTED | 4 | WrXDTED==1 | WRITING_XDTED |
|  |  | WrXDTED==0 | REQ_WRITE |
| REQ_WRITE | 5 | always | WAIT_FOR_WACK |
| READING_XDTED | 6 | StillRdXDTED==1 | READING_XDTED |
|  |  | StillRdXDTED==0 | INCREMENT |
| WAIT_FOR WACK | 7 | UCWACK=1 | INCREMENT |
|  |  | UCWACK=0 | WAIT_FOR_WACK |
| INCREMENT | 8 | always | REQ_READ |

Figure 6:
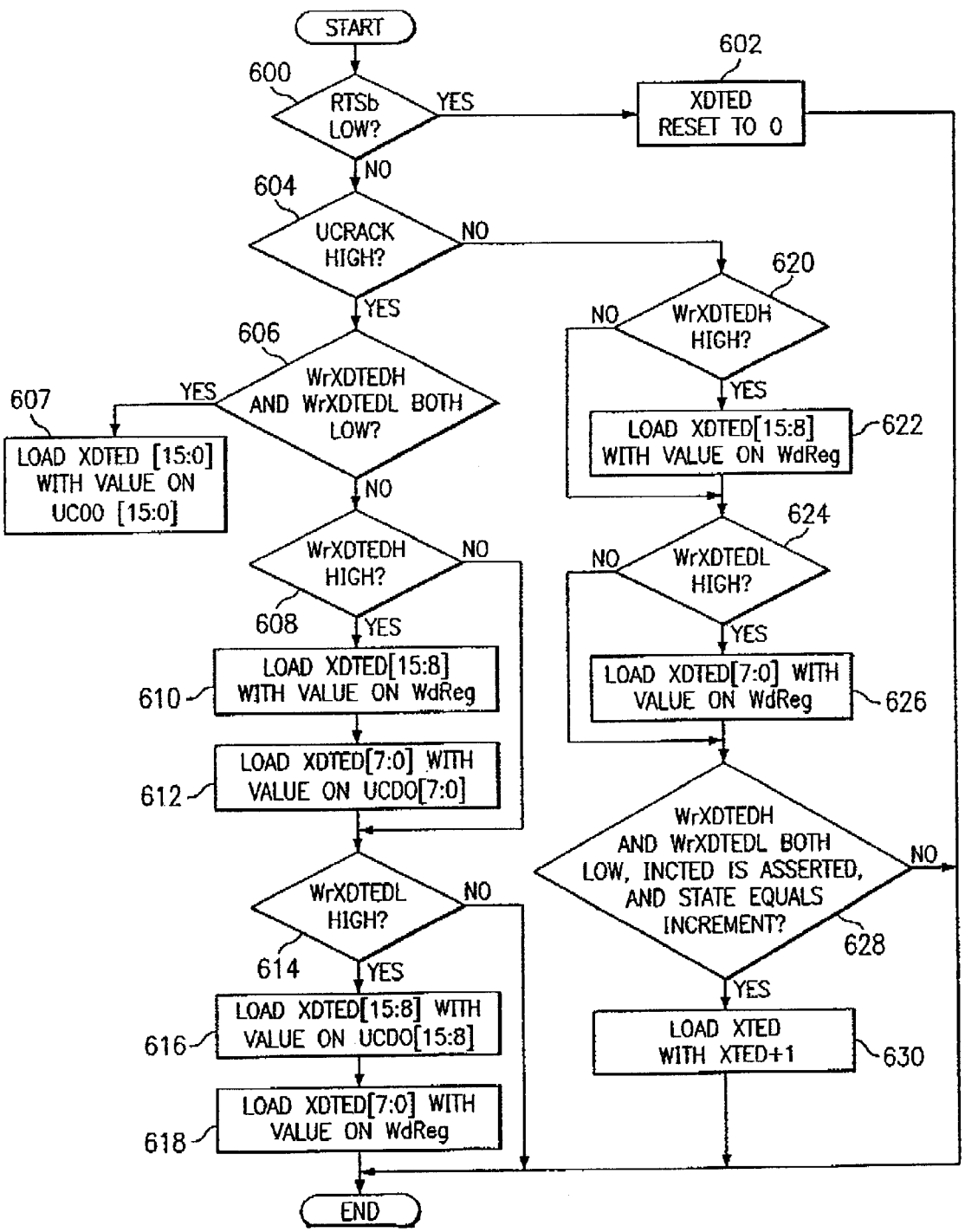
FIG. 6 is a flowchart of data flow in a XDTED register located within the indexed buffer controller circuit in accordance with a preferred embodiment of the present invention.

With reference now to FIG. 6, a flowchart of data flow in a XDTED register located within the indexed buffer controller circuit in FIG. 4 is depicted in accordance with a preferred embodiment of the present invention. The process begins by determining whether the reset signal RTSb is low (step 600). If RTSb is low, XDTED is set equal to zero (step 602).

On the other hand, if RTSb is high, a determination is made as to whether UCRACK is high (step 604). A high value for UCRACK indicates that data from the buffer is ready to be read. In response to a high value for UCRACK, a determination is made as to whether WrXDTEDH and WrXDTEDL are both low (step 606). If both of these signals are low, XDTED [15:0] is loaded with the value on UCDO [15:0] (step 607). Thereafter, a determination is then made as to whether WrXDTEDH is high (step 608). WrXDTEDH is a write data register control signal and indicates that the microprocessor is trying to write the high byte. If WrXDT-EDH is high, XDTED bits 15 to 8 are loaded with the value on WdReg, the data bus from the microprocessor (step 610), and XDTED bits 7 to 0 are loaded with the value from bits 7 to 0 on the bus to the buffer (step 612).

Then, a determination is made as to whether WrXDTEDL is high (step 614). This determination also is made if WrXDTEH is not high in step 608. WrXDTEDL is a write data register control signal that indicates that the microprocessor is trying to write the low byte. If WrXDTEDL is high, XDTED bits 15 to 8 are loaded with the value from bits 15 to 8 from the data bus to the buffer (step 616), and XDTED bits 7 to 0 are loaded with the value from WdReg, the bus to the microprocessor (step 618) with the process terminating thereafter. With reference again to step 614, if WrXDTEDL is not high, the process also terminates.

Referring again to step 604, if UCRACK is not high, a determination is made as to whether WrXDTEDH is high (step 620). If WrXDTEDH is high, bits 15 to 8 of XDTED are loaded with the value on WdReg (step 622). Thereafter, a determination is made as to whether WrXDTEDL is high (step 624). The process proceeds directly to step 624 from step 620 if WrXDTEDH is not high in step 620. If WrXDTEDL is high, bits 7 to 0 in XDTED are loaded with the value on WdReg (step 626).

Then, a determination is made as to whether both WrXDTEDH and WrXDTEDL are both low, INCTED is asserted, and STATE equals INCREMENT (step 628). Both of the signals are low when no data is currently available from the buffer and the microprocessor is not trying to write. If both of these signals are low, XTED is loaded with XTED plus 1 (step 630) with the process terminating thereafter. The process also terminates in step 628 if both WrXDTEDH and WrXDTEDL are not low, INCTED is not asserted, or STATE does not equal INCREMENT in step 628.

Figure 7:
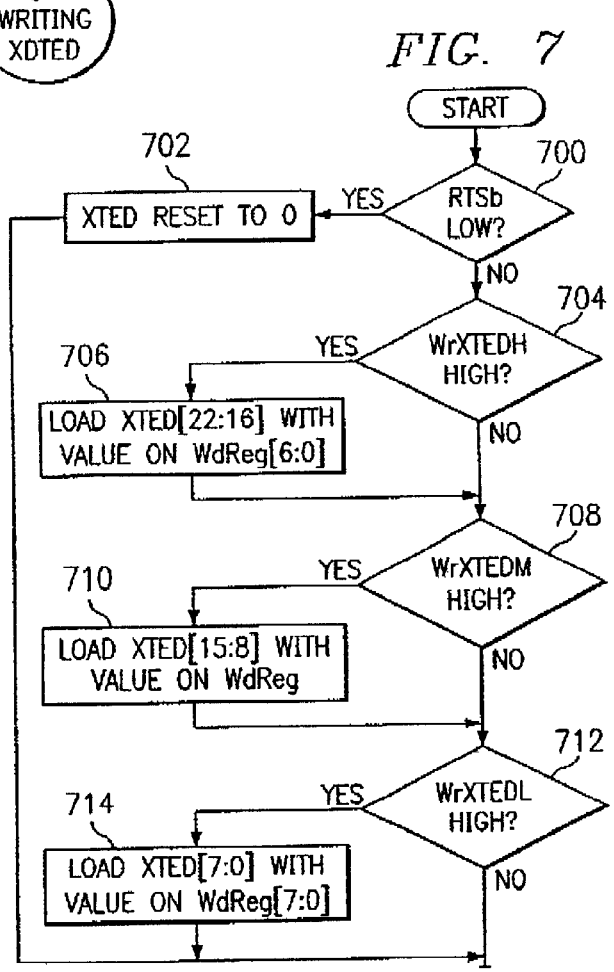
FIG. 7 is a flowchart of data flow in a XTED register located within the indexed buffer controller circuit in accordance with a preferred embodiment of the present invention.

With reference now to FIG. 7, a flowchart of data flow in a XTED register located within the indexed buffer controller circuit in FIG. 4 is depicted in accordance with a preferred embodiment of the present invention. The process begins by determining whether RTSb is low (step 700). If RTSb is low, a reset condition is present and XDTED is reset to zero (step 702) with the process terminating thereafter. If RTSb is high, a determination is then made as to whether WrXTEDH is high (step 704). WrXTEDH is a write address register high byte control signal, indicating that the microprocessor is trying to write to the index register, XTED. If WrXTEDH is high, bits 22 to 16 of XTED are written with the value on bits 6 to 0 on WdReg, which is the bus to the microprocessor (step 706). The process then determines whether WrXTEDH is high (step 708). WrXTEDM is a write address register middle byte control signal, indicating that the microprocessor is trying to write to the index register, XTED. The process proceeds directly to step 708 from step 704 if WrXTEDH is not high in step 704.

If WrXTEDM is high, bits 15 to 8 of XTED are written with the value on WdReg, the bus to the microprocessor (step 710). Then, a determination is made as to whether WrXTEL is high (step 712). WrXTEDL is a write address register low byte control signal, indicating that the microprocessor is trying to write to the index register, XTED. The process proceeds directly to step 712 from step 708 if WrXTEDM is not high in step 708. If WrXTEDL is high, bits 7 to 0 of XTED are written with the value on bits 7 to 0 on WdReg, the bus to the microprocessor (step 714) with the process terminating thereafter. If WrXTEDL is not high, the process also terminates.

The description of the preferred embodiment of the present invention has been presented for purposes of illustration and description, but is not limited to be exhaustive or limited to the invention in the form disclosed. Many modifications and variations will be apparent to those of ordinary skill in the art. For example, the present invention also may be implemented using analog circuitry. In addition although the depicted example used a microprocessor, other types of controllers may be used in accordance with a preferred embodiment of the present invention. The embodiment was chosen and described in order to best explain the principles of the invention and the practical application to enable others of ordinary skill in the art to understand the invention for various embodiments with various modifications as are suited to the particular use contemplated.

What is claimed is:

1. A method for controlling access to a memory using a first register and a second register, the method comprising:

writing data into the second register from a location in the memory associated with an address stored in the first register in response to a change in the address in the first register, wherein the address includes a selection bit in a least significant portion of the address;

reading data from a first portion of the second register in response to the selection bit having a first value;

reading data from a second portion of the second register in response to the selection bit having a second value; and incrementing the address in the first register each time data is read from the second register.

2. The method of claim 1, wherein the memory is a buffer memory.

3. The method of claim 1, wherein the first register is an index register.

4. The method of claim 1, wherein the second register is a data storage register.

5. The method of claim 1, wherein the step of reading data is performed by a controller.

6. The method of claim 5, wherein the controller is a microprocessor.

7. An apparatus comprising:

a memory;

a data storage register connected to the memory and to a controller, wherein the controller requires two accesses to read and write data to and from the data storage register; and an index register having a first connection to the memory and having a second connection to the controller, wherein the index register receives an address to a memory location in the memory, wherein each time the address is changed in the index register, data associated with the address is automatically written into the data storage register and wherein in an automatic increment mode, the address in the index register is automatically incremented each time the data storage register is accessed by the controller.

8. The apparatus of claim 7, wherein the data storage register is a 16 bit register.

9. The apparatus of claim 7, wherein the index register is a 23 bit register.

10. The apparatus of claim 7, wherein the memory is a buffer memory.

11. The apparatus of claim 7, wherein the controller is a microprocessor.

12. An apparatus comprising:

a data register connected to a memory and connected to the controller; and an index register connected to the memory and connected to the controller;

wherein the apparatus has a plurality of modes of operation including:

a first mode of operation in which in response to receiving an address in the index register to a memory location in the memory, data is written into the data register;

a second mode of operation, responsive to data being read into the data register, in which a first portion of data is read from the data register;

a third mode of operation, responsive to the first portion of data being read from the data register, in which the address is incremented in the index register; and a fourth mode of operation, responsive to the address being incremented in the index register, in which a second portion of the data is read from the data register.

13. The apparatus of claim 12, wherein the plurality of modes of operation includes:

a fifth mode of operation, responsive to writing data into a first portion of the data register, in which data in the data register is written into a location in the memory identified by an address in the index register;

a sixth mode of operation, responsive to data being written into the location, in which the address in the index register is incremented;

a seventh mode of operation, in response to incrementing the address, in which data is written into a second portion of the data register; and an eighth mode of operation, responsive to data being written into the second portion of the data register, in which the data in the data register is written into the location.

14. The apparatus of claim 13, wherein the address includes a plurality of bits that identify a location in the memory and a bit which causes data to be written into the first portion of the data register when the bit has a first value and causes data to be written to a second portion of the data register when the bit has a second value.

15. The apparatus of claim 12, wherein the controller writes data into the first portion of the data register in a first write to the data register and writes data into the second portion of the data register in a second write to the data register.

16. The apparatus of claim 12, wherein the controller reads data from the first portion of the data register in a first access of the data register and reads data from the second portion of the data register in a second access of the data register.

17. A storage device comprising:

a data storage mechanism;

a controller;

a read channel connected to at least one of the data storage mechanism and the controller, wherein the controller controls access of data from the data storage mechanism;

a buffer memory, wherein data is stored in the buffer memory prior to being transferred to a host; and a host interface having a first connection to the read channel, a second connection to the controller, and a third connection to a buffer memory, wherein the host interface includes:

a first register;

a second register; and a plurality of modes of operation including:

a first mode of operation, responsive to receiving an address to a location in the buffer memory, causes data to be written into the second register;

a second mode of operation, responsive to data being read into the second register, in which a first portion of data is read from the second register;

a third mode of operation, responsive to the first portion of data being read from the second register, in which the address is incremented in the first register; and a fourth mode of operation, responsive to the address being incremented in the first register, in which a second portion of the data is read from the second register.

18. The storage device of claim 17, wherein the first register is an index register and the second register is a data storage register.

19. The storage device of claim 17, wherein the controller is a microprocessor.

20. The storage device of claim 17, wherein the storage device is a CD-ROM drive.

21. The storage device of claim 17, wherein the storage device is a DVD ROM drive.

22. The storage device of claim 17, wherein the storage device is a hard disk drive.

23. A memory controller comprising:

a first register having an input for receiving address from a controller and an output; and a second register having a first input for receiving data from the controller, a second input for receiving data from a memory, a first output for sending data to the controller, and a second output for sending data to the memory;

wherein data from a location is written into the second register in response to an address being changed in the first register and wherein an access of the second register causes the address in the first register to be automatically incremented such that successive locations in the memory may be accessed.

24. The memory controller of claim 23 further comprising:

a first select logic having an input for receiving data from the controller and an output connected to the input of the second register, wherein the first selection logic selects a portion of the second register in which data from the controller is written based on the address in the first register; and a second select logic having an input connected to the output of the data storage register and an output for sending data to the controller, wherein the second selection logic selects a portion of the second register from which data is sent to the controller based on the address in the first register.

25. The memory controller of claim 24, wherein the address includes a selection bit used to control the first select logic and the second select logic and wherein incrementing the address changes the portion of the second register selected by the first selection logic and selected by the second selection logic.

26. The memory controller of claim 25, wherein the selection bit is a least significant bit in the address.

27. The memory controller of claim 23, wherein the first register is an index register.

28. The memory controller of claim 23, wherein the second register is a data storage register.

29. The memory controller of claim 23, wherein the controller is a microprocessor.

30. A memory controller comprising:

a buffer an index register, wherein the index register holds an address, the address comprising a plurality of bits;

a data storage register having a first input for receiving data from a memory, a second input for receiving data from a controller, and a first output for sending data to the memory, and a second output for sending data to the controller;

a first reading means for reading data from the buffer into the data storage register in response to a change in the address;

a second reading means for sending a portion of the data in the data storage register to the controller;

a first writing means for writing data from the controller into a portion of the data storage register based on the address; and a second writing means for writing the data in the data register into the memory in response to the data being written into the data storage register by the controller.

31. The memory controller of claim 30, wherein the first writing means writes data into a first portion of the data storage register and into a second portion of the data storage register based on a bit in the address.

32. The memory controller of claim 30, wherein the second reading means reads data from a first portion of the data storage register and from a second portion of the data storage register based on a bit in the address.

33. The memory controller of claim 30, wherein a bit within the plurality of bits is a least significant bit and wherein remaining bits in the address are used to identify the location in the memory.

* * * * *